May 24, 1966     H. R. GREENLEE     3,252,610

TUBULAR WALL REINFORCED PRESSURE VESSEL

Filed Oct. 30, 1963

INVENTOR.
Harry R. Greenlee
BY
Harness and Harris
ATTORNEYS.

United States Patent Office 3,252,610
Patented May 24, 1966

---

3,252,610
TUBULAR WALL REINFORCED PRESSURE VESSEL
Harry R. Greenlee, Detroit, Mich., assignor to Chrysler Corporation, Highland Park, Mich., a corporation of Delaware
Filed Oct. 30, 1963, Ser. No. 320,204
6 Claims. (Cl. 220—3)

This invention relates generally to a pressure vessel and more particularly to a pressure vessel of the type employing tubing as a container for fluid under pressure.

The inclusion of tubing within a pressure vessel for the dual purpose of giving structural strength to the pressure vessel while providing a storage container for the containment therein of a high pressure fluid has been disclosed in U.S. Patents 2,937,698 and 2,962,195.

The pressure vessels as disclosed in said U.S. patents are constructed, generally, by coiling tubing in tightly wound concentric rings internally of and against the inner surface of a separate tank. The adjacent loops of tubing are brazed to each other and to the inner surface of the relatively thin wall forming the separate tank.

If the pressure vessel, as briefly described above, is sectioned by a plane substantially transverse to the longitudinal axis of the tubing, a generally triangular space will be observed between adjacent coils of tubing and the inner surface of the wall forming the separate tank. Each of the two legs of the triangle which are respectively defined by the outer surface of adjacent coils of tubing are, of course, arcuate while the third leg, defined by the inner surface of the tank wall generally between the coils of tubing, may be arcuate or substantially straight depending on the shape of the tank and the direction in which the tube is called. One of the angles or apexes of the triangle is determined by the adjacent coils of tubing while the other two apexes are determined by the respective coils engaging, in line contact, the inner surface of the wall of the separate tank.

It has been discovered that under certain conditions, pressure vessels as disclosed in said U.S. patents may be made to experience a failure often characterized by a protuberant or bulging portion of the tank wall. Such bulging portions, of course, have at least the possibility of becoming leak paths for the escape of pressurized fluid to the ambient atmosphere. It has also been discovered that the relative susceptibility of any such particular pressure vessel to develop the aforementioned bulging portions is related to the length of the said third leg, or unsupported span, of the triangle. The term "unsupported span" is believed to be descriptive in the sense that the coiled tubing provides a support against radial expansion of the tank wall at the point or points at which such tubing is joined to the inner surface of the tank wall while the portion of the tank wall between successive coils does not have an additional supporting member.

Accordingly, an object of this invention is to provide a pressure vessel of improved construction, employing tubing for the purposes disclosed in said U.S. patents, which greatly reduces, if not totally eliminates, the possibility of the formation of protuberant or bulging portions as described above.

Other more specific objects and advantages of this invention will become apparent when reference is made to the following description considered in conjunction with the accompanying drawings wherein.

Figure 1:
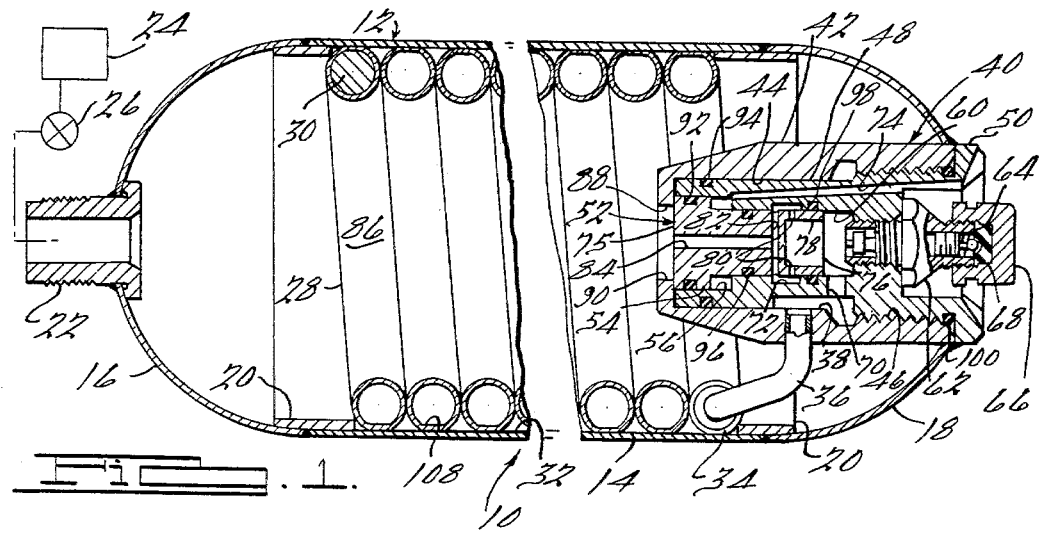
FIGURE 1 is a longitudinal cross-sectional view of a pressure vessel constructed in accordance with the teachings of this invention.

Referring now in greater detail to the drawings, FIGURE 1 illustrates a pressure vessel 10 comprised of a tank 12 having a centrally disposed cylindrical wall structure 14 capped by generally spherical headers or end members 16 and 18 which are welded thereto. A reinforcing ring member 20 may be provided at each end to facilitate the joining of the headers to the wall structure 14. A suitable outlet fitting 22 extending through header 16 and suitably secured thereto as by welding provides passage means for the communication of pressurized fluid, contained within vessel 10, to a suitable fluid consuming area or device 24. Valve means 26, connected in serial relationship with fitting 22, regulates the flow of pressurized fluid to the consuming area 24.

A length of tubing 28, capped at one end as at 30, is coiled within the tank 10 in a generally helical pattern. Each ring or coil of tubing 28 is integrally bonded to its adjacent coils and to the inner surface 32 of the wall structure 14 so that the tubing, in addition to providing a storage compartment for pressure fluid, serves to strengthen the wall structure 14.

The other end 34 of tubing 28 is capped except for a conduit 36 which communicates between that end of tubing 28 and chamber 38 of an inlet valve assembly 40 which is suitably secured, as by welding, to header 18. Valve assembly 40 is comprised of a housing portion 42 provided with a cylindrical chamber 44 and a substantially axially aligned internally threaded portion 46 which threadably engages an internally disposed valve body 48. A tool-engaging head portion 50 may be provided for tightly securing body 28 within housing 42.

A valve member 52, retained generally by valve body 48, has one end 54 of enlarged diameter slidably received within a cylindrical chamber 56 formed in body 48. A second cylindrical chamber 60 formed in body 48 in substantial axial alignment with chamber 56 slidably receives the other end of valve 52.

An inlet valve 62, which resembles a heavy duty valve used on automobile tires, is carried by valve body 48 in a manner so as to have one end thereof in communication with chamber 60 and its other end 64 adapted to be at times operatively connected to a suitable source of pressurized fluid. A protective cap 66 and sealing member 68 may be threadably engaged with valve end 64.

Valve body 48 is also provided with a passageway 70, communicating between chambers 38 and 60, and an annular recess 72 formed in the wall of chamber 60. An elongated conduit 74, formed generally axially of valve body 48, vents a portion of chamber 56 to the ambient atmosphere.

End 76 of valve 52 has a recess formed therein in a manner defining an axially directed annular wall portion 78 through which are formed a plurality of radially directed circumferentially spaced conduits 80. When valve 52 is in the position illustrated conduits 80 complete communication between chamber 60 and the annular recess 72. Conduits 82 and 84 formed respectively transversely and longitudinally in valve 52 complete communication between the annular recess 72 and the interior chamber 86 of the tank 12. As illustrated at 88 and 90, radially inwardly directed finger portions may be provided in order to contain valve 52. Annular seals 92, 94, 96, 98 and 100 are, of course, provided so as to isolate the various chambers from each other and prevent undesirable leaks.

In order to charge the pressure vessel 10 with a pressurized fluid, cap 66 and seal 68 are removed and a suitable source of pressurized fluid is connected to inlet valve 62 and the fluid under pressure directed therethrough into chamber 60, through passage 70 into chamber 38 and through conduit 36 into tubing 28. At this time the pressure of the fluid in chamber 60 creates a force sufficient to hold valve 52 in the position illustrated permitting pressurized fluid to also flow through radial conduits 80 into the annular recess 72 and subsequently through conduits 82 and 85 into chamber 86.

If it is assumed that the axially projected area of end surface 75 of valve 52 is twice that of the projected area of end 76 it becomes apparent that flow of fluid from the pressurized source through valve 62 will be automatically terminated when the fluid pressure within tubing 28 is substantially equal to the pressure of the fluid as it enters valve 62 and when the fluid pressure within chamber 86 is substantially equal to half of the pressure within tubing 28. That is, pressurized fluid will continue to flow into tubing 28 and chamber 86 causing the pressure within each to continually rise. The pressure within tubing 28, of course, cannot exceed the pressure of the fluid being directed thereto. Radial conduits 80, however, present at least a slight restriction to flow thereby permitting a differential pressure to exist axially across valve 52. Since the areas of ends 75 and 76 are assumed to be in a ratio of 2:1, it becomes apparent that, neglecting any frictional resistance or hysteresis, valve 52 will be in a balanced condition when the pressure on end surface 75 is half that on end 76 since at that time the resulting opposed forces will be of the same magnitude. Any subsequent increase in pressure within chamber 86 will result in a larger force against end surface 75 causing the valve 52 to move to the right, for example, until enlarged portion 54 abuts against the end of cylindrical chamber 56. As valve 52 is so moved to the right, conduits 80 are moved out of registry with annular recess 72 thereby terminating the further flow of pressurized fluid therethrough.

Subsequently, when the contents of pressure vessel 10 are to be used, valve 26 is opened permitting the flow of pressurized fluid out of chamber 86 through fitting 22 and to the consuming device 24. The flow of fluid out of chamber 86 is accompanied by at least a slight reduction of pressure therein reversing the previously described action against valve 52 so as to cause valve 52 to once more assume a position generally as illustrated thereby permitting the pressurized fluid in tubing 28 to be fed through conduits 36, 70, 80, 82 and 84 into chamber 86. Valve 52, at this time in particular, serves as a metering valve in maintaining the pressure within chamber 86 at a value no greater than approximately half of that within the tubing 28.

Figure 2:
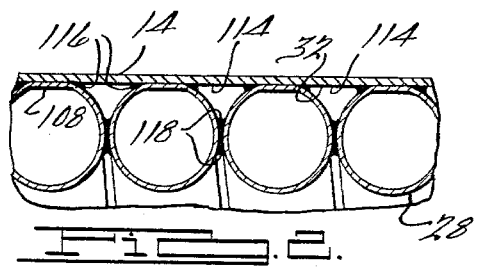
FIGURE 2 is an enlarged fragmentary view of a portion of FIGURE 1.

As will be noted from both FIGURES 1 and 2 the tubing employed has a wall of circular cross-section. Such tubing is selected for at least two reasons. That is, first, a circle defines the greatest area for the least amount of perimeter thereby maintaining the tubing wall area and consequently the weight thereof at a minimum and secondly, a circular configuration possesses the highest bursting strength.

As previously stated, it has been discovered that the unsupported span of the tank wall between adjacent tube coils may under some circumstances become bulged.

Figure 3:
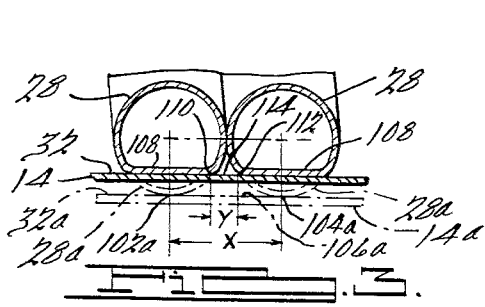
FIGURE 3 is an enlarged fragmentary cross-sectional view somewhat diagrammatically illustrating the improved construction of the pressure vessel of FIGURES 1 and 2 in comparison to that of the prior art.

FIGURE 3 illustrates, somewhat diagrammatically, a fragmentary portion of the pressure vessel of FIGURE 1. In U.S. Patents 2,937,698 and 2,962,195 the coiled tubing is disclosed as being of circular cross-section (shown in FIGURE 3 by the phantom line portion indicated at 28a) engaging, with only line contact, the inner surface 32a of the tank wall 14a as at points 102a and 104a. For purposes of discussion let it be assumed that the length of the unsupported span 106a of the tank wall 14a is equivalent to the distance X, between points 102a and 104a.

As will be noted from each of FIGURES 1, 2, 3 and 4, the radially outer-most surface of the coiled tubing 28 is provided with a flattened portion 108 which enables the tubing to have a path of contact with the inner surface 32 of the tank wall 14 instead of the line contact represented by points 102a and 104a. Points 110 and 112, at a distance, Y, from each other represent the length of the unsupported span 114 in the improved construction according to this invention. As can be seen from FIGURE 3, by flattening the tube 28 to have a configuration as illustrated instead of the continuous circular portion represented by 28a, the length, X, the unsupported span 106a has been reduced by approximately 75% while the decrease in tube area or volume has been diminished by only approximately 15%.

Figure 4:
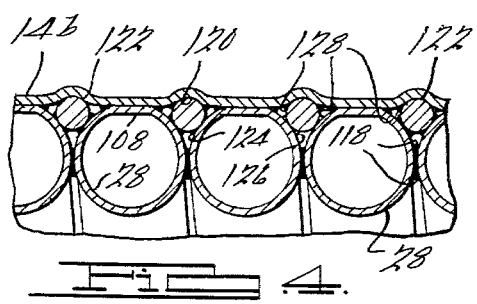

The illustration of FIGURE 3 is, of course, diagrammatic and it has been determined that flattened portions of such a relatively large width in relation to the cross-sectional size of the tubing are not necessary in order to accomplish the intended purpose, which is, to reduce the length of the unsupported span of the tank wall. For example, FIGURES 1, 2 and 4 illustrate the tubing 28 as being provided with a comparatively small flattened portion 108. It should be apparent that the length of the unsupported span of the tank wall can be reduced by 50% by the provision of a relatively small flattened portion on the tubing. Further, flattened portions of relatively narrow width, as illustrated in FIGURES 1, 2 and 4 reduce the volume of the tubing by what can be considered a negligible amount.

As better illustrated in FIGURE 2, each of the tube coils is secured preferably as by brazing, as at 116, to the inner surface 32 of the tank wall 14, and further secured to each other as by brazing at 118.

FIGURE 4 illustrates another form of the invention wherein means are provided for still further reducing the length of the unsupported span between successive coils of tubing. In the embodiment of FIGURE 4, the tank wall 14b is formed as to provide a helical groove 120 in the inner surface thereof so as to partially receive therein a coiled wire 122. The coils of tubing 28 are arranged intermediate of the coils of wire and brazed not only as illustrated in FIGURE 2, but further brazed to adjoining coils of wire as at 124 and 126. The wire, in turn, is secured within the helical groove 120 as by brazing at 128 to the tank wall 14b.

Figure 5:
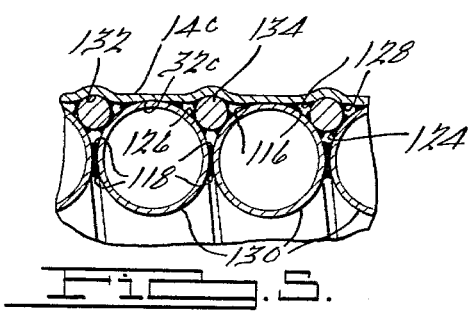

FIGURE 5, a modification of the embodiment shown in FIGURE 4, illustrates tubing 130 which has not been provided with a flattened portion 108 as shown in FIGURES 1, 2 and 4. In the embodiment of FIGURE 5, helical grooves 132, similar to grooves 120 of FIGURE 4, and helically wound wire 134 are respectively formed and selected of a size which enables the circular tubing 130 to be called between adjacent coils of wire in a manner so as to contact adjacent coils of wire and the inner surface 32c of the tank wall 14c. As in FIGURE 4 adjacent coils of tubing are joined to each other by brazing as at 118 and secured to the inner surface 32c as at 116. Similarly, wire 134 is secured as by brazing at 128 to the inner surface 32c and at 124 and 126 to adjacent coils of tubing.

Figure 6:
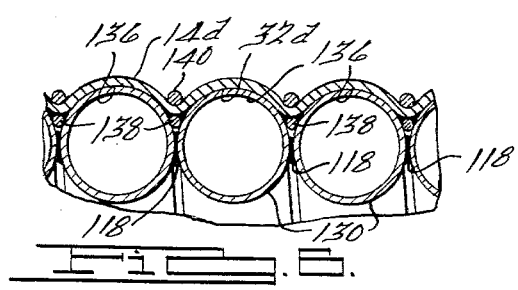
FIGURES 4, 5 and 6 are views similar to FIGURE 2 illustrating other embodiments of the invention.

FIGURE 6, a still further modification of the invention, discloses circular tubing 130 nested within relatively large helical grooves 136 formed in the tank wall 14d. Adjacent coils of tubing are brazed to each other as at 118 and to the inner surface 32d of the tank wall 14d. Further, a relatively small diameter wire 138, as compared for example to wire 134, is located in the small generally triangular space existing between adjacent coils of tubing and inner surface 32d. Wire 138 is provided for the same purpose as are wires 122 and 134 of FIGURES 4 and 5, respectively. That is, wire 138 is secured as by brazing to adjacent coils of tubing and the inner surface 32d. Additionally, an externally located restraining wire 140 may be wound about tank wall 14d so as to be nested generally radially outwardly of the coils of wire 138 thereby further providing an increase in the strength of the tank wall portion intermediate the coils of tubing.

Various methods may be employed for the construction of a pressure vessel in accordance with the invention. For example, with particular reference to the embodiment of FIGURES 1 and 2, the pressure vessel may be constructed in the following manner.

The relatively thin cylindrical wall structure 14 may be formed as by drawing, or extruding or formed from flat sheet metal stock of a thickness substantially that desired in the final pressure vessel wall. If flat sheet metal stock is to be employed, the stock is formed into a substantially cylindrical cross-section and the curled-over ends of the stock are joined to each other as by welding. After the ends are welded, the structure is drawn so as to obtain a more nearly perfect cross-sectionally circular cylindrical wall.

Once the cylindrical wall structure 14 is formed, the annular reinforcing rings 20 (which also act as welding chill members as will become obvious) are inserted into the open ends of wall 14 and tack welded thereto. The tubing 28, plugged at one end as at 30, is then coiled about a suitable mandrel and the flattened outer portion 108 is formed by any suitable means, such as a die member or a suitable roller. The coiled tubing is then inserted into the cylindrical wall 14 so as to assume a position as that generally illustrated in FIGURE 1.

Subsequently the subassembly, comprised of the wall 14, chill members 20 and tubing 28, is placed within a suitable furnace in a position so as to have the longitudinal axis thereof disposed in a generally vertical position. A suitable brazing compound is then placed on the tubing at the top-most portion thereof and furnace temperature maintained in the order of 2050° F. in order to flow the brazing material between adjacent coils of tubing and between the respective surfaces of the coils and inner surface of the cylindrical wall 14. Preferably the furnace should have a hydrogen atmosphere and the subassembly exposed to the aforementioned temperature for a period of approximately five minutes.

Headers 16 and 18 are formed so as to each be of generally spherical concave configuration and the outlet fitting 22 may be secured to the header 16, through a suitable aperture formed therein, as by welding thereto. Similarly the housing 40 of the inlet valve assembly may be secured to header 18. In order to assure proper bonding of the respective headers to the chill rings 20, the subassembly comprised of the cylindrical wall, chill rings and tubing is further machined after the brazing operation so as to remove a slight amount of material from the extending portions of the chill rings and the axial end surfaces of the cylindrical wall 14 so as to remove any brazing material therefrom. Header 18 may then be joined to the said subassembly as by welding and the conduit 36 may at this time be joined to the housing 40 by brazing. Header 16 may then be similarly secured to the other end of the wall structure 14 and chill plate 20 as by welding.

It should be apparent that in addition to the above various modifications of the method described may be employed. For example, it is possible that it may be desirable to not only form the tubing about a mandrel, but also to at that time secure each of the coils thereof to each other as by brazing and then subject the coiled tubing to a grinding operation as would be possible on a centerless grinder so as to grind the outer surface of the flattened portion of the tubing to a more nearly perfect cylindrical form, thereby still further assuring a more intimate and perfect brazed bond to be subsequently achieved between the tubing end and inner surface of the cylindrical wall structure. If this should be desired, then it would be a necessary expedient to eliminate at least one of the chill rings so that the brazed coiled tubing could be inserted into the wall structure and subsequently inserting the eliminated chill ring and then brazing as previously described.

The methods described above could be practiced substantially as disclosed in achieving the construction disclosed in FIGURE 6. However, even though it should be apparent in view of the specific discussion with reference to FIGURE 6, it should nevertheless be stated that after the cylindrical wall was formed that it would have to be exposed to a subsequent operation for forming the helical grooves 32d which accommodate the coiled tubing. One way of forming these helical grooves would be by mounting the cylindrical structure 14 on a lathe-like machine and inserting a forming tool internally thereof so as to form the walls of the structure 14 radially outwardly against a cooperating die member thereby forming not only the grooved configuration but also the helix required to accommodate the coiled tubing. Preferably, although not necessary, the coiled tubing would first be joined as by brazing before insertion into the grooved wall structure 14d and the internally disposed supporting coiled wire 138 would be wound about the coiled tubing and introduced into the grooved wall 14d simultaneously with insertion of the coiled tubing. The structure would then be submitted to the brazing operation as described with reference to FIGURES 1 and 2, and the remaining steps of the method in regard thereto could be followed in completing the pressure vessel disclosed by FIGURE 6.

It should be apparent that the modification of FIGURES 4 and 5 may be manufactured by adapting the steps of the methods described with reference to FIGURES 1, 2 and 6.

Although, but one preferred form of the invention and three modifications thereof have been disclosed and described, it is apparent that other modifications and embodiments of the invention are possible within the scope of the appended claims.

I claim:

1. A pressure vessel comprising a wall structure defining a closed container, tubing of arcuate cross-section generally helically coiled and received within said container in a manner whereby the outermost surface of the tube coils is in abutting relationship with said wall structure over at least a major portion of the surface area of the inner side of said wall structure, said outermost surface of the tube coils being formed so as to define a generally helical path of contact of substantial width with said inner side, said tube coils being arranged in successive abutting relationship and said tubing throughout a major portion of its length being integrally bonded along said path of contact to said inner side of said wall structure and said successive abutting tube coils being bonded to each other so that the structural strength of said bonded tube coils contribute to the ability of the container to withstand internal pressure, a helical groove formed in said inner side of said wall structure so as to be generally midway between the midpoints of successive abutting tube coils, and a helically coiled wire member received within said groove so as to be generally in juxtaposition with adjoining tube coils, said wire being bonded over a major portion of its length to adjacent tube coils and said groove in order to strengthen generally that portion of said wall structure defining said groove.

2. A pressure vessel comprising a wall structure defining a closed container, a helical groove formed in the surface of the inner side of said wall structure, a coiled wire member received by said groove and intimately bonded thereto, and a length of tubing coiled and received generally between successive coils of said wire in a manner so as to be generally nested therebetween and against the surface of the inner side of said wall structure, said tubing being intimately bonded to said wire and said surface so as to contribute to the structural strength of said wall structure.

3. A pressure vessel comprising a wall structure defining a closed container, a helical groove formed in the surface of the inner side of said wall structure, a coiled wire member received by said groove and intimately bonded thereto, and a length of tubing coiled and received generally between successive coils of said wire in a manner so as to be generally nested therebetween, and the radially outermost portion of each of the tube coils being formed to provide a segment of a cylindrical surface with its axis of curvature generally transverse to the longitudinal axis of said tubing, said segments being received between said coils of wire and abutting against a portion of the surface of the inner side of said wall structure, said tubing being bonded to said portion of the surface of the inner side of said wall structure along said segments and said wire being bonded to said tubing along portions of said tubing other than said segments, said coils of tubing being further bonded to each other so as to result in said tubing, wire and wall structure forming a unitary member.

4. A pressure vessel comprising a wall structure defining a closed container, a helical groove formed in the surface of the inner side of said wall structure, a length of tubing coiled and received generally by said groove, the outermost surface of the tube coils being in abutting relationship with said groove so as to form a path of contact therebetween of arcuate cross-section and substantial chordal length, and a length of coiled wire received between successive tube coils and said inner side of said wall structure so as to contact such successive tube coils and said inner side of said wall structure, said wire being intimately bonded to said inner side and said tube coils being intimately bonded to said wire and said inner side of said wall structure so as to contribute to the structural strength of said wall structure.

5. A pressure vessel comprising a wall structure defining a closed container, tubing of arcuate cross-section generally helically coiled and received within said container in a manner whereby the outermost surface of the tube coils is in abutting relationship with said wall structure over at least a major portion of the surface area of the inner side of said wall structure, said outermost surface of the tube coils being flattened thereby defining a generally flat helical path of contact of substantial width with said inner side, said tube coils being arranged in successive abutting relationship and said tubing throughout a major portion of its length being integrally bonded along said path of contact to said inner side of said wall structure and said successive abutting tube coils being bonded to each other so that the structural strength of said bonded tube coils contribute to the ability of the container to withstand internal pressure, a helical groove formed in said inner side of said wall structure so as to be generally midway between the midpoints of successive abutting tube coils, and a helically coiled wire member received within said groove so as to be in jutaposition with adjoining tube coils, said wire being bonded over a major portion of its length to adjacent tube coils and said groove in order to strengthen generally that portion of said wall structure defining said groove.

6. A pressure vessel comprising a wall structure defining a closed container, tubing of arcuate cross-section generally helically coiled and received within said container in a manner whereby the outermost surface of the tube coils is in abutting relationship with said wall structure over at least a major portion of the surface area of the inner side of said wall structure, said outermost surface of the tube coils being flattened thereby defining a generally flat helical path of contact of substantial width with said inner side, said tube coils being arranged in successive abutting relationship and said tubing throughout a major portion of its length being integrally bonded along said path of contact to said inner side of said wall structure and said successive abutting tube coils being bonded to each other so that the structural strength of said bonded tube coils contribute to the ability of the container to withstand internal pressure, and a helically coiled wire member received generally between adjoining tube coils and the inner surface of said container, said wire being bonded over a major portion of its length to such adjacent tube coils and to said inner surface of said container in order to strengthen generally that portion of said wall structure located generally between said adjacent tube coils.

References Cited by the Examiner

UNITED STATES PATENTS

| | | | |
|---|---|---|---|
| 1,888,835 | 11/1932 | Ragan | 29—463 |
| 2,372,800 | 4/1945 | Stearns | 220—3 |
| 2,376,831 | 5/1945 | Stearns | 220—3 |
| 2,840,897 | 7/1958 | Ingalls | 29—463 |
| 2,962,195 | 11/1960 | Greenlee | 222—394 |

FOREIGN PATENTS

| | | |
|---|---|---|
| 821,520 | 10/1959 | Great Britain. |
| 563,680 | 1/1957 | Italy. |

THERON E. CONDON, *Primary Examiner.*

R. H. SCHWARTZ, *Examiner.*